Jan. 16, 1962 J. F. WELLEKENS 3,016,839
TORQUE VALVES
Filed Jan. 5, 1960 2 Sheets-Sheet 1
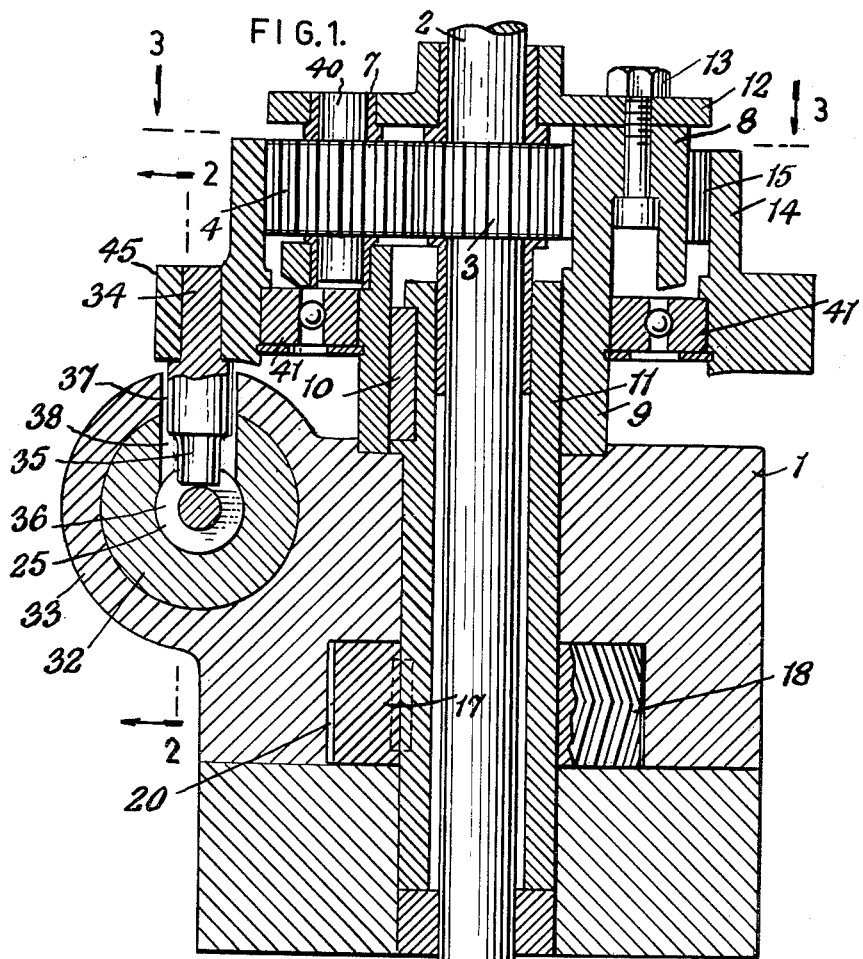
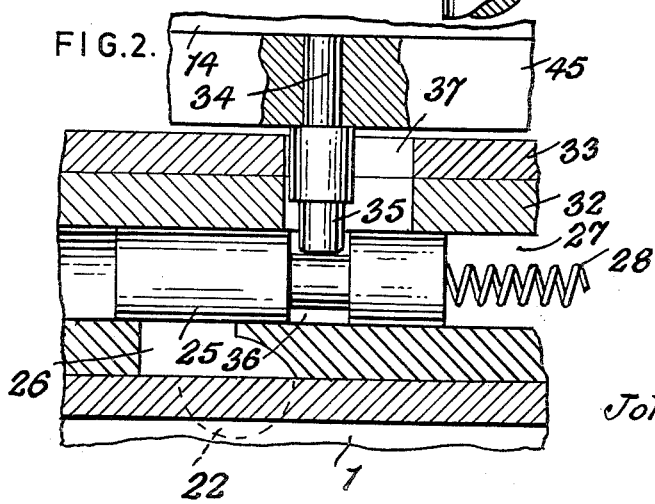
INVENTOR.
John F. Wellekens
BY
Harry Redzinsky
Attorney

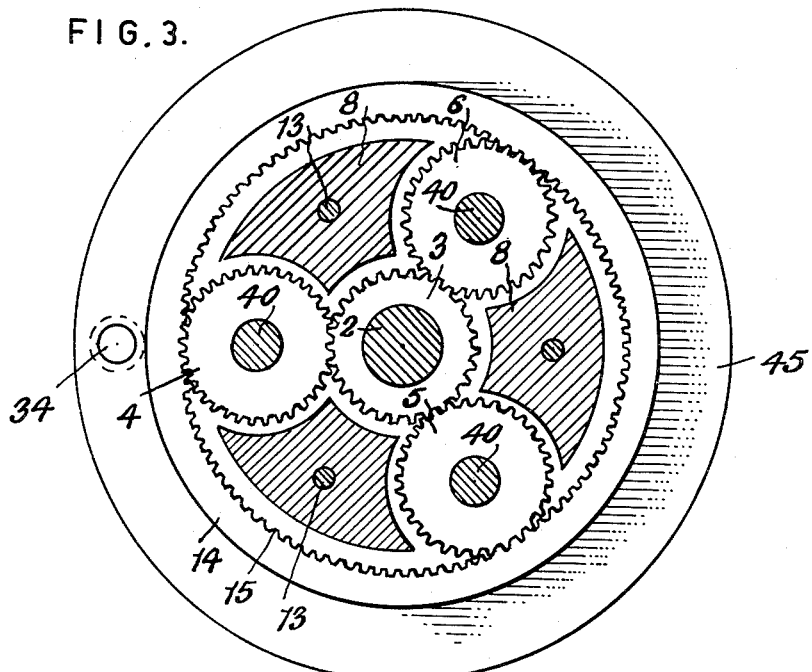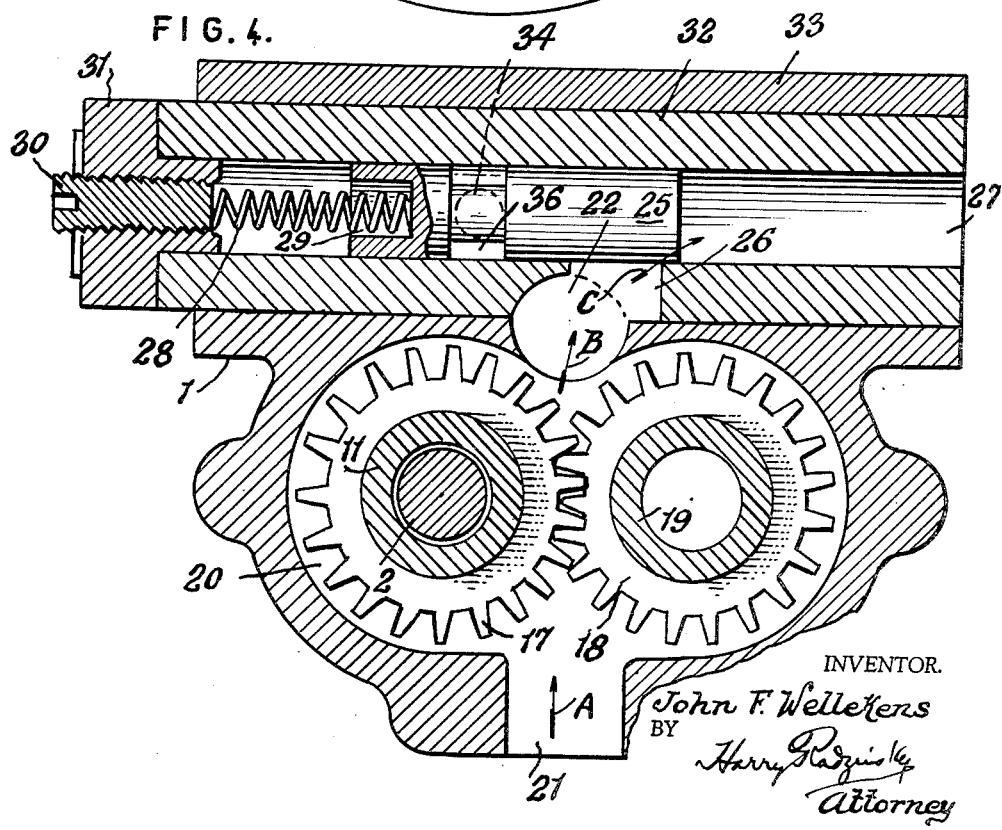

United States Patent Office 3,016,839
Patented Jan. 16, 1962

3,016,839
TORQUE VALVES
John F. Wellekens, 41 Crescent Ave., New York, N.Y.
Filed Jan. 5, 1960, Ser. No. 592
2 Claims. (Cl. 103—41)

This invention relates to torque valves and more particularly to a valve adapted for use in connection with pumps, and an example of which can be found in pre-oilers for aircraft engines.

In an apparatus of such nature, oil is pumped from the aircraft engine; the oil is heated in a tank or reservoir and is kept therein at the required temperature until the aircraft is ready for flight whereupon the heated oil is pumped back into the engine. It is desirable, when the oil is so returned to the engine that it shall be of the proper viscosity and of the right temperature and by the use of a torque valve of the character to be described, any oil of greater viscosity than desired, will apply a torque load on the valve to an extent to cause the same to open and unload the pump by causing a porting of the oil back to its source or into a suitable reservoir, rather than delivering the oil to the aircraft engine.

It is an object of the present invention to provide a valve of the character described having its movement readily controlled by torque loads; which will be of simple construction; which will be adjustable to cause valve movement to open or closing positions under the application of specific torque loads and which shall have other advantages readily apparent to those skilled in this art.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a vertical sectional view, with some parts broken away, of a torque valve mechanism embodying the present invention;

FIG. 2 is a sectional view, taken substantially on the line 2—2 of FIG. 1, looking in the direction of the arrows;

FIG. 3 is a sectional view, taken substantially on the line 3—3 of FIG. 1, looking in the direction of the arrows, and FIG. 4 is a horizontal sectional view through the valve mechanism.

The improved torque valve is particularly adapted for use in connection with a pump, such as employed, for example, in pre-oilers used for aircraft engines. Such devices are generally employed for removing oil from the crankcases of the engines, maintaining the oil so removed and replenishing it if necessary while maintaining it at a desired temperature, and when preparing the aircraft for flight the oil is pumped back into the engine so that when the engine is started it may be done so with the assurance that the required parts thereof have been lubricated with hot oil. The torque valve of the present invention is specially useful for such apparatus, but it will also be found to be of advantage wherever the operation of a valve controlled by the torque of a rotating element, is found desirable or necessary.

Referring to the drawings, 1 indicates generally the housing of a pump mechanism such as one to which the improved torque valve has been applied. Extending through the housing 1 is a shaft 2 of an electric motor, not shown, but suitably coupled to shaft 2 in a manner to cause rotation of the shaft 2 at the required rate of speed.

Fixed on the shaft 2 is a gear 3, the same being in mesh with and operative to rotate, the three gears shown respectively at 4, 5 and 6. The gears 4, 5 and 6 have their shafts 40, mounted in the bushings 7, fitted in a spider 8, having a hub 9 keyed to a tubular shaft 11 by a key 10. The tubular shaft 11 is arranged concentrically around the shaft 2 and is rotative independently thereof. The spider 8 includes a top plate 12, secured to the body of the spider by bolts 13, and the shafts 40 of the several gears 4, 5 and 6, rotative in the bushings 7 extend between the body of the spider and its top plate 12 as clearly shown in FIG. 1.

Supported on the bearings shown at 41 is a ring gear 14 having internally-formed teeth 15 meshing with the teeth on the several gears 4, 5 and 6 in a planetary arrangement. The ring gear 14 has a restricted rotative movement sufficient to open a slide valve under high torque loads, such as when the oil that is being pumped is cold or is of too great viscosity, to thereby unload the pump by porting the pump output back to the oil reservoir, and to recirculate the oil within the reservoir back to the pump inlet.

Keyed on the tubular shaft 11 is one of the pump gears shown at 17, the same meshing with a similar gear 18 on shaft 19. The two gears 17 and 18 form a gear pump for movement of the oil. In FIG. 4 the gears 17 and 18 are more or less diagrammatically shown, since these gears in actual practice fit the pump chamber more closely than is disclosed in the drawing. The oil inlet opening leading into the pump chamber 20 in which gears 17 and 18 are rotative, is shown at 21, and during operation of the pump, the oil passes through the inlet opening 21, as indicated by the arrow "A" in FIG. 4, to be moved by operation of the gears 17 and 18 toward and through the outlet opening 22. In normal operation of the pump, and while the oil is of the desired viscosity and temperature, the oil entering through the inlet 21 and being drawn from a supply within the reservoir, which is above described, may surround the pump housing, will be forced out through the outlet opening 22 and then through a hose connected to said outlet to the engine or wherever it is intended for use. However, when the oil is cold, or of a too-high viscosity, and a high torque load is resultantly applied to the pump gears, a normally-closed slide valve will be opened, thus permitting the oil to be ported back through opening 26 into an outlet passage 27 connected to or in communication with the reservoir from whence the supply of oil is being taken.

The slide valve 25 is in the form of a piston biased to closed position by means of a spring 28 having one end seated in a recess 29 in one end of the piston 25 and its other end bearing against an adjustable plug 30 that is threadably mounted in a closure cap 31 fitting into one end of the passage 27. The passage 27 is formed in a sleeve 32, extending through a boss 33 formed as a part of the housing 1.

By suitable adjustment of the plug 30 the pressure of the spring 28 can be regulated according to various torque loads so that when a relatively high torque load occurs, the resistance of the spring 28 will be overcome and the valve 25 will be forced toward the left, as viewed in FIG. 4, to uncover the port 26, allowing it to establish communication between the outlet passage 27 and the pump chamber 20 and thus cause oil pumped by the gears 17 and 18 to be ported out through the outlet passage 27 and returned to the reservoir or to some other source. As the oil increases in temperature or its viscosity changes, the torque load will be reduced so that it can be overcome by the spring 28 which will then force the valve 25 to its closed position, as shown in FIG. 4, the outlet 27 being thereupon closed, and the pumping of the oil through the outlet 22 will then occur.

The means for causing the opening of the slide valve 25 consists of the ring gear 14, which has a slight rotative movement under torque load and which by such movement, moves the valve 25 in a direction opposite to the force exerted by its biasing spring 28. For this purpose the ring gear 14 is provided with a radial flange 45 carrying a projecting pin 34 having its free end reduced in diameter and fitting into an annular groove 36 formed in the slide valve 25. The boss 33 of the housing 1 is formed with a solt 37, and a similar registering slot 38 is formed in the sleeve 32. The pin 34 is movable, to a limited extent, in these registered slots and is operative to move the slide valve 25 to its open position under excessive torque load.

In the normal operation of the device, oil entering through the inlet 21, will enter as indicated by the arrow "A," and by the rotative movement of the pump gears 17 and 18 will be moved toward and through the outlet 22, as indicated by the arrow "B" for delivery to the engine or to other point of use. If the oil is of the proper viscosity and temperature and imposes a torque load insufficient to overcome the force exerted by the spring 28, the engagement of the pin 34 with the slide valve 25 will cause the ring gear 14 to be maintained stationarily, during which time the spider 8, carrying the gears 4, 5 and 6 will rotate inside of the ring gear 14 without imparting any rotative movement to the ring gear. However, when resistance to the action of the pump gears is set up because of improper viscosity of the oil or when high torque loads are otherwise imposed on the pump, the force of the spring 28 will be overcome by the pressure imposed on the ring gear and said gear will be caused to be rotatively moved for a restricted distance, but sufficient to move the slide valve 25 to the left, as viewed in FIG. 4, and to open position, allowing the porting of the oil through the port 26 and into passage 27 as indicated by the arrow "C" in FIG. 4, the oil being thus returned to its source of supply. When the excessive torque load is reduced, the spring 28 will again become effective to close the slide valve 25 and again permit the oil to be moved through the outlet passage 22.

While I have herein shown, for illustrative purposes, the applicability of the described torque valve for aircraft pre-oilers, it is to be understood that it may be employed for other purposes and the specific use herein described is not to be taken as a limitation on the device or its uses.

What I claim is:

1. A torque valve construction comprising, a gear pump, a shaft extending from one of the gears thereof, said shaft carrying a spider on which a plurality of gears is rotatively mounted, a drive shaft having a driving gear centrally positioned between those on the spider and operative to rotate said gears, a ring gear encircling the spider-borne gears, said ring gear having its teeth engaging those on the latter gears, a housing encircling the gear pump, a sleeve in the housing, a slide valve spring-biased and movable back and forth in the sleeve, the bias-exerting spring acting to normally locate the valve in one position, the valve being capable of movement to another position in opposition to its spring-bias, the spring being operative to hold the ring gear against rotative movement during operation of the pump under given torque load and to permit movement of said ring gear to the second position when such torque load is exceeded, the spring being adjustable to vary its force against the valve, the valve having a groove and the coupling between the ring gear and the valve consisting of a pin projecting from the ring gear and entering into the groove.

2. A torque valve construction as provided for in claim 1, wherein the ring gear is provided with a radially-projecting flange, the pin extending from said flange, the pin extending parallel to the spider-carrying shaft, the sleeve and the housing having registered slots through which the pin passes to reach and enter the groove in the slide valve, the spring being located within the sleeve, and the adjusting means for the spring being operable through one end of the sleeve.

References Cited in the file of this patent

UNITED STATES PATENTS

| | | |
|---|---|---|
| 2,205,235 | Arnold | June 18, 1940 |
| 2,371,227 | Dodge | Mar. 13, 1945 |
| 2,633,806 | Perkins | Apr. 7, 1953 |
| 2,794,349 | Smirl | June 4, 1957 |
| 2,852,130 | Wallace | Sept. 16, 1958 |